United States Patent [19]

Fromm et al.

[11] 4,049,021

[45] Sept. 20, 1977

[54] VARIABLE DOME VALVES AND COMBUSTORS PROVIDED WITH SAID VALVES

[75] Inventors: Ellsworth H. Fromm; Norman R. Murray, both of Bartlesville, Okla.

[73] Assignee: Phillips Petroleum Company, Bartlesville, Okla.

[21] Appl. No.: 567,954

[22] Filed: Apr. 14, 1975

[51] Int. Cl.² ............................................. F16K 5/10
[52] U.S. Cl. .............................. 137/625.31; 251/208; 431/188
[58] Field of Search .................. 137/625.3, 625.31; 251/208, 345; 431/188

[56] References Cited

U.S. PATENT DOCUMENTS

| 1,304,402 | 5/1919 | Spire | 431/188 |
| 1,535,903 | 4/1925 | Collins | 431/188 |
| 1,733,792 | 10/1929 | Good | 222/242 |
| 2,227,666 | 1/1941 | Noack | 431/61 X |
| 2,655,787 | 10/1953 | Brown | 60/39.23 |

FOREIGN PATENT DOCUMENTS

| 310,159 | 11/1932 | Italy | 137/625.31 |

*Primary Examiner*—Arnold Rosenthal

[57] ABSTRACT

A variable valve is provided for mounting on the end of a tubular conduit for controlling fluid flow through said conduit. Said valve is particularly well adapted to be employed as a dome valve on the upstream end of a flame tube of a combustor for controlling admission of a stream of combustion air to said flame tube.

10 Claims, 13 Drawing Figures

VARIABLE DOME VALVES AND COMBUSTORS PROVIDED WITH SAID VALVES

This invention relates to end or dome valves and to combustors having a flame tube provided with a said valve.

Air pollution has become a major problem in the United States and other highly industrialized countries of the world. Consequently, the control and/or reduction of said pollution has become the object of major research and development effort by both governmental and nongovernmental agencies. Combustion of fossil fuel is a primary source of said pollution. It has been alleged, and there is supporting evidence, that the automobiles employing conventional piston-type engines burning hydrocarbon fuel are a major contributor to said pollution. Vehicle emission standards have been set by the United States Environmental Protection Agency (EPA) which are sufficiently restrictive to cause automobile manufacturers to consider employing alternate engines instead of the conventional piston engine.

The gas turbine engine is being given serious consideration as an alternate engine. CO emissions in conventional prior art gas turbine processes operated for maximum fuel combustion efficiency are not usually a problem. However, nitrogen oxides emissions, usually referred to as $NO_x$, are a problem because the high temperatures generated in such prior art processes favor the production of $NO_x$. A gas turbine engine employed in an automobile or other vehicle will be operated over a wide range of varying operating conditions including a driving cycle comprising idle, low speed, moderate speed, high speed, acceleration, and deceleration operations. These varying conditions also create serious problems in controlling both $NO_x$ and CO emissions. Frequently, when a combuster is operated for the control of one of $NO_x$ or CO emissions, control of the other is lost. Both must be controlled. Thus, there is a need for a combustor of practical and/or realistic design, which can be operated in a manner such that the pollutant emissions therefrom will meet said EPA standards. Even a combustor, and/or a combustion process, giving reduced pollutant emissions approaching said standards would be a great advance in the art. Such a combustor, or process, would have great potential value because it is possible the presently very restrictive EPA standards may be relaxed even further than has been recently indicated.

The present invention solves the above described problems by providing a dome valve which is adapted to be mounted on the dome or upstream end of the flame tube in a combustor. Said dome valve provides means for varying and/or controlling the flow of a stream of combustion air into a first combustion region of a combustor in accordance with fuel flow to said combustor. Such control makes possible the operation of a combustor over a wide range of driving conditions, such as the above-described driving cycle, and still maintain control of both $NO_x$ and CO emissions.

In its broadest aspects the valve of the invention is not limited to being employed on a flame tube of a combustor. As described further hereinafter, the valve of the invention can also be employed on the end of a conduit for controlling fluid flow through said conduit.

Thus, according to the invention, there is provided a valve, adapted to be mounted on the end of a tubular conduit for controlling fluid flow through said conduit, said valve comprising: a fixed tubular inner member, closed at one end and open at the other end; a plurality of openings provided at spaced apart locations around and extending through the tubular wall of said inner member adjacent said closed end thereof; an adjustable annular throttle member rotatably mounted on and around said tubular member; a plurality of openings provided around and extending through said throttle member, said openings being of a size, a shape, a number, and located at spaced apart locations, corresponding to said openings in said tubular inner member; mounting means secured to said tubular inner member adjacent and around said open end thereof for mounting said valve on the end of said conduit; and means for rotating said throttle member around said inner tubular member within limits so as to bring said openings in said throttle member into and out of register with said openings in said tubular member and thereby vary the effective size of said openings.

In a presently preferred embodiment the invention provides a variable dome valve, adapted to be mounted on the dome end of a flame tube in a combustor for controlling flow of a stream of combustion air into said flame tube, said valve comprising: a fixed generally cylindrical inner member, closed at one end and open at the other end; a plurality of openings provided at spaced apart locations around and extending through the cylindrical wall of said inner member adjacent said closed end thereof; a mounting flange secured to and around said inner member adjacent said open end thereof for mounting said valve on a said flame tube; an adjustable throttle ring rotatably mounted on and around said cylindrical inner member; a plurality of openings provided around and extending through said throttle ring, said openings being of a size, a shape, a number, and located at spaced apart locations, corresponding to said openings in said inner member; and means for rotating said throttle ring around said inner cylindrical member so as to bring said openings in said throttle ring into and out of register with said openings in said inner member and vary the effective combined open area of said openings and thereby control the flow of a stream of combustion air into said flame tube.

Referring now to the drawings, wherein like or similar reference numerals are employed to denote like or similar elements, the invention will be more fully explained with particular reference to preferred embodiment thereof.

Figure 1:
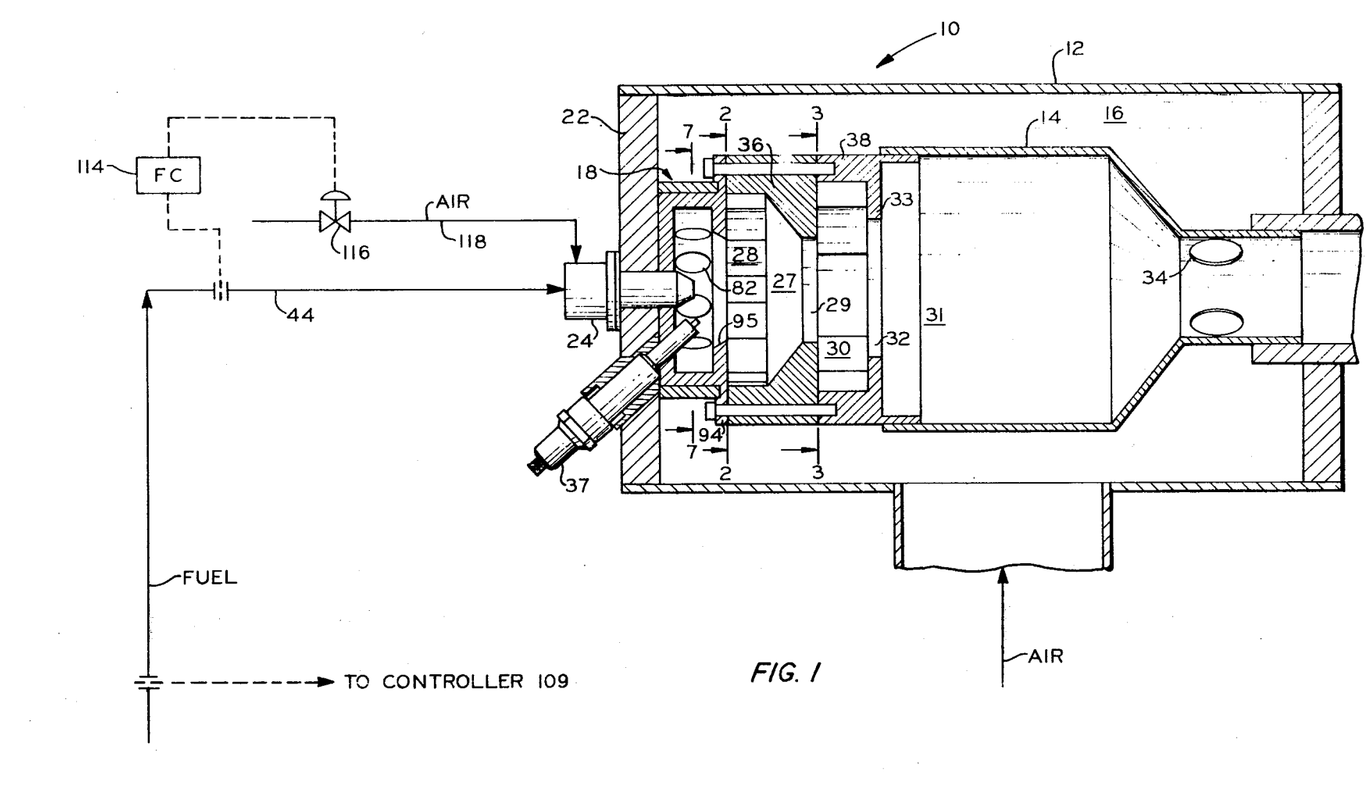
FIG. 1 is a view, partially in cross section, of a combustor having a variable dome valve mounted on the flame tube of the combustor in accordance with the invention.
Figure 2:
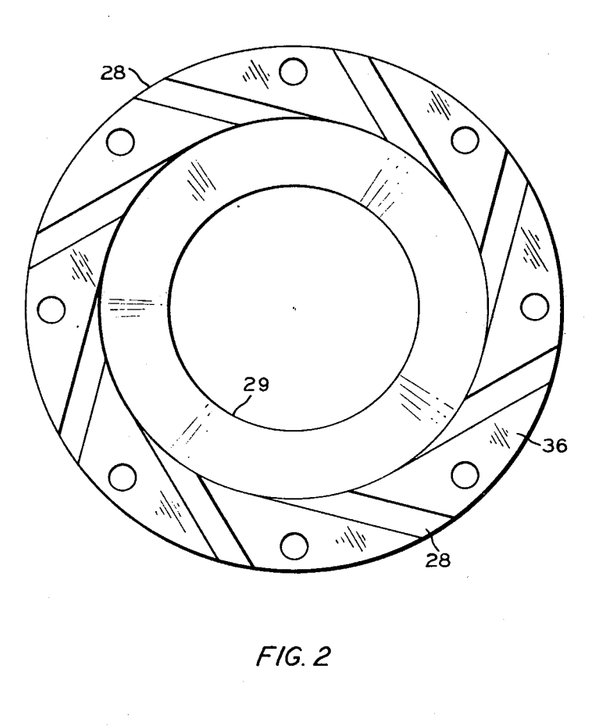
FIG. 2 is an enlarged view, in elevation, taken along the line 2—2 of FIG. 1 and illustrating one set of tangential entry ports or slots in the flame tube of the combustor.
Figure 3:
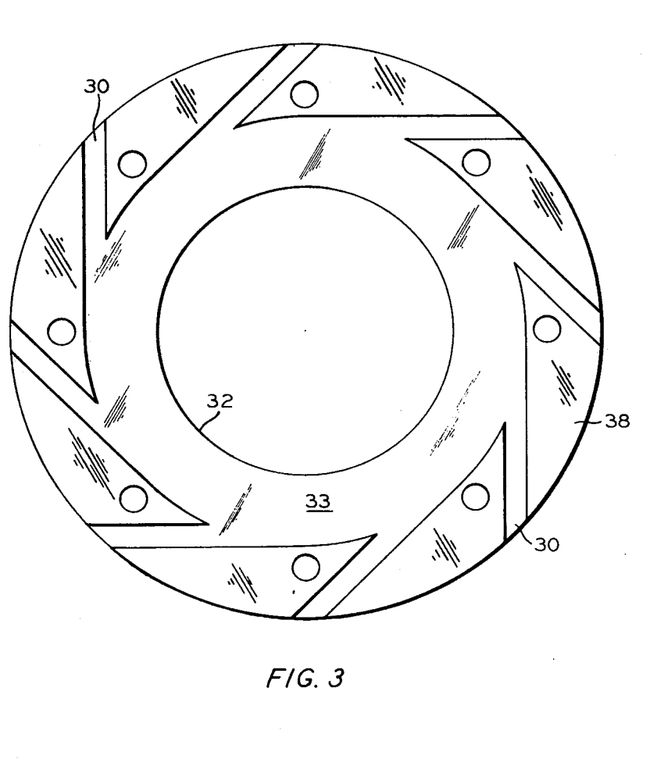
FIG. 3 is an enlarged view, in elevation, taken along the line 3—3 of FIG. 1 and illustrating another set of tangential entry ports or slots in the flame tube of the combustor.

FIGS. 1-7, inclusive, 9, and 10 illustrate a combustor provided with a variable dome valve in accordance with the invention. Said combustor is denoted generally by the reference numeral 10. Preferably, said combustor comprises an outer housing or casing 12 having a flame tube 14 disposed, preferably concentrically, therein and spaced apart from said casing to form an annular chamber 16 between said casing 12 and said flame tube 14. Said flame tube can be supported in said housing or casing by any suitable means. While it is preferred to provide the combustor with an annular casing or housing, similarly as illustrated, so as to provide said annular space 16 for supplying air to the various inlets (described hereinafter) in said flame tube, it is within the scope of the invention to alter the configuration of said housing or casing, or to omit said housing or casing and supply said air inlets individually by means of individual conduits. Said flame tube 14 is provided at its dome or upstream end with a dome valve 18. A fuel inlet means is provided for introducing a stream of fuel into the upstream end portion of said flame tube. As illustrated in FIG. 1, said fuel inlet means comprises a fuel conduit 44 leading from a source of fuel and extending into communication with fuel nozzle 24 mounted in fuel flange 22 which closes the upstream end of casing 12. Said fuel nozzle extends into said dome valve 18. An annular orifice means is disposed on the downstream side of said dome valve 18. Said orifice means can preferably be formed integrally with said dome valve as here illustrated and can preferably comprise an annular flange 94 for mounting the downstream end of said dome valve 18 onto the upstream end of said flame tube 14. A first orifice 95 formed in said orifice means can be considered to define the outlet from said dome valve 18 and the inlet to the first combustion section of the combustor.

A variable first air inlet means is provided in said dome valve for admitting a variable volume of a first stream of air through said dome valve, around said fuel inlet nozzle 24, and into said first combustion region 27 of said flame tube. As described further hereinafter, said variable first air inlet means comprises at least one air passage means of variable cross-sectional area provided in and extending through said dome valve 18 into communication with said first combustion region 27, and means for varying the cross-sectional area of said air passage means and thus controlling the volume of said first stream of air admitted to said first combustion region. A second air inlet means is disposed in the wall of said flame tube for tangentially admitting a second stream of air into said first combustion region 27 tangential to the wall thereof. Said second air inlet means preferably comprises a plurality of tangential slots 28 extending through the wall of the upstream end portion of said flame tube 14 at a first station in the flame tube adjacent said outlet from said dome valve 18. A third air inlet means is disposed in the wall of said flame tube downstream from said second air inlet means for tangentially admitting a third stream of air into a second combustion region 31 located in said flame tube 14 adjacent, downstream from, and in communication with said first combustion region 27. Said third air inlet means preferably comprises a plurality of tangential slots 30 extending through the wall of an intermediate portion of said flame tube 14 at a second station in the flame tube adjacent and downstream from a second orifice 29 which can be considered to define the outlet from said first combustion region. A third orifice 32 is disposed in said flame tube adjacent and downstream from said tangential slots 30. Preferably, a fourth air inlet means, comprising at least one opening 34, is provided in the wall of said flame tube at a third station downstream from said third air inlet means 30 and said third orifice 32 for admitting a fourth stream of air comprising quench or dilution air into said flame tube 14.

Said flame tube 14 can be fabricated integrally if desired. However, for convenience in fabrication, said flame tube can preferably be formed with its wall divided into separate sections similarly as here illustrated. Thus, in one preferred embodiment said tangential slots 28 can be formed in an upstream first wall section 36 of said flame tube, preferably in the upstream end portion of said first wall section with the downstream wall of said flange 94 forming the upstream walls of said slots. In said preferred embodiment said tangential slots 30 can be formed in an intermediate second wall section 38 located adjacent and downstream from said first wall section 36. Preferably, said second wall section 38 is disposed with its upstream edge contiguous to the downstream edge of said first wall section 36, and said tangential slots 30 are formed in the upstream end portion of said second wall section 38 with the downstream edge of said first wall section 36 forming the upstream walls of said slots 30. In this preferred embodiment said third orifice 32 is formed in said second wall section 38 and adjoins said slots 30 formed therein. Preferably, the inner wall surface of said first wall section 36 tapers inwardly from the downstream edge of said tangential slots 28 to the upstream edge of said second orifice 29 to form an inwardly tapered passageway from said slots to said orifice. Preferably, the downstream end of said second wall section 38 comprises an annular radially extending wall member 33, with said third orifice 32 being formed in said wall member 33 and with the upstream wall of said wall member 33 comprising at least a portion of the downstream walls of said slots 30. Said annular wall member 33 provides for the abrupt expansion of hot combustion products flowing from first combustion region 27 to second combustion region 31.

It will be understood that the combustors described herein can be provided with any suitable type of ignition means and, if desired, means for introducing a pilot fuel to initiate combustion. For example, a spark plug 37 can be mounted to extend through flange 22 and the upstream end of dome valve 18 as shown.

Referring to FIGS. 4, 5, 6, and 7, said dome valve 18 comprises a fixed, preferably generally cylindrical, inner member 80 (see FIG. 6) closed at one end and open at the other end. A plurality of openings 82 are provided at spaced apart locations around the circumference of said cylindrical member 80 adjacent the closed end thereof. An opening 84 is provided in said closed end for receiving a fuel inlet nozzle, e.g., nozzle 24 of FIG. 1, which extends through the flange 22 of housing or outer casing 12. The outlet of said fuel nozzle would be positioned similarly as shown for nozzle 24 in FIG. 1. Said fuel inlet nozzle can be any suitable type of fuel nozzle. As here shown it is an air assist fuel nozzle of conventional design wherein air is used in atomizing the fuel. Another opening 88 is provided in said closed end for receiving an igniter means, such as spark plug 37 in FIG. 1, which also extends through said flange 22. Opening 92 are provided for receiving mounting bolts (not shown) for mounting the dome valve on said flange 22 and within housing or casing 12. Preferably, a mounting flange 94 is connected to and provided around the open end of said cylindrical member 80 for mounting said member 80 on the upstream end of a flame tube, e.g., flame tube 14 in FIG. 1. Any other suitable mounting means can be provided on the base of said member 80. Preferably, a groove 96 is provided in said flange 94 around the open base of said cylindrical member 80. A pair of spaced apart stop pins 98 project from said flange 94 perpendicular thereto and adjacent said cylinder member 80. An orifice 95, preferably tapered inwardly, is provided in said flange 94 adjacent and in communication with the open end of said cylindrical member 80. Thus, said flange 95 comprises an orifice means with said orifice 94 defining the outlet from said dome valve.

Figure 5:
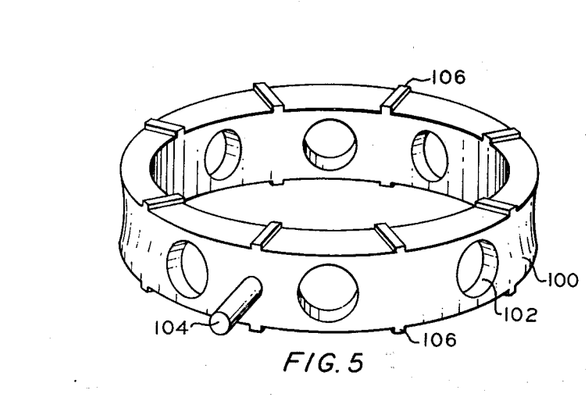
FIG. 5 is a perspective view further illustrating an element of the dome valve of the combustor of FIG. 1.
Figure 7:
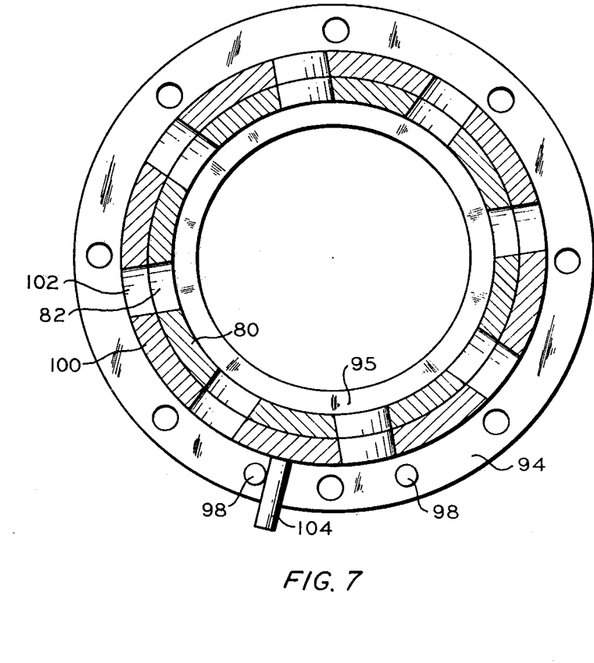
FIG. 7 is a sectional view taken along the line 7—7 of FIG. 1.

The adjustable throttle ring 100 of FIG. 5 is mounted around said cylindrical inner member 80 and is provided with a plurality of spaced apart openings 102 therein of a size, number, and shape and at spaced apart locations, corresponding to said openings 82 in cylindrical member 80. Said throttle ring fits into groove 96 in flange 94 when said groove is provided. An actuator pin 104 projects outwardly from the outer surface of said throttle ring 100 and coacts with said stop pins 98 to limit the movement of said ring 100. Friction reducing lugs 106 can be provided on the top and the bottom of said ring 100 for movably bearing against the inner surface of flange 22 in housing 12 and the bottom of groove 96, respectively, FIG. 7 is a cross section of ring 100 mounted on member 80.

Figure 8:
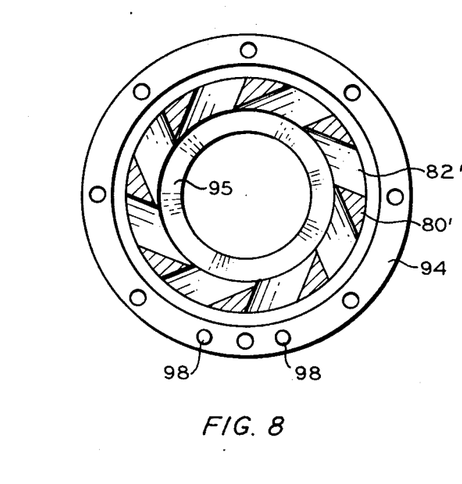
FIG. 8 is a sectional view, taken through a location corresponding to that of FIG. 7, and illustrating features of another dome valve which can be employed in combustors in accordance with the invention and in the operation of said combustors.
Figure 9:
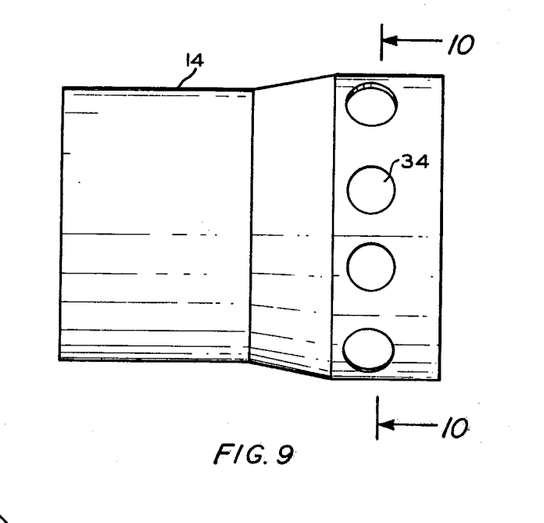
FIG. 9 is a top plan view of the downstream portion of the flame tube of the combustor of FIG. 1.
Figure 10:
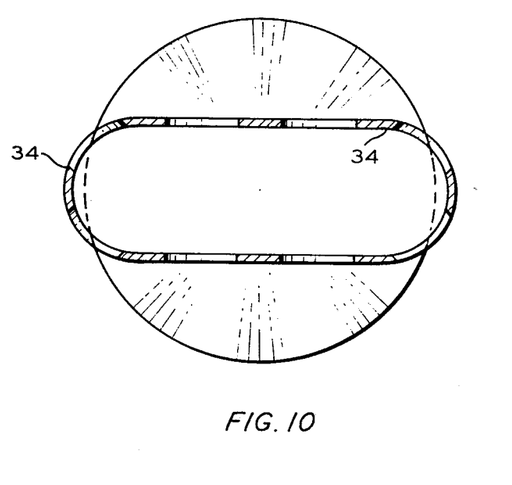
FIG. 10 is a sectional view taken along line 10—10 of FIG. 9.

FIG. 8 illustrates a modified cylindrical member 80' which can be employed in a modification of said dome valve 18. Said modified cylindrical member 80' is essentially like the cylindrical member 80 shown in FIGS. 6 and 7 except that openings 82' in the modified cylindrical member 80' extend tangentially therethrough instead of radially. It will be understood that the corresponding openings in the corresponding modified throttle ring (not shown) which is employed with said modified cylindrical member 80' are correspondingly tangential.

It has been found that when combustors are provided with air assist fuel inlet nozzles, or with any other air assist fuel introduction means, it is desirable to control the amount of air supplied to the fuel nozzle in accordance with the fuel flow to said nozzle. Any suitable control means can be employed for this purpose and the specific means illustrated in FIG. 1 forms no part, per se, of this invention and can be modified or substituted for as desired. As shown diagrammatically in FIG. 1, the flow controller 114 actuates valve 116 in air conduit 118 responsive to the flow of fuel through the orifice in fuel conduit 44 to program an increase in air flow to nozzle 24 to accompany an increase in fuel flow, or vice versa. Said valve 116 can be a flow control valve for controlling volume of flow, or a pressure regulator valve for holding a constant pressure in the conduit downstream therefrom.

Figure 4:
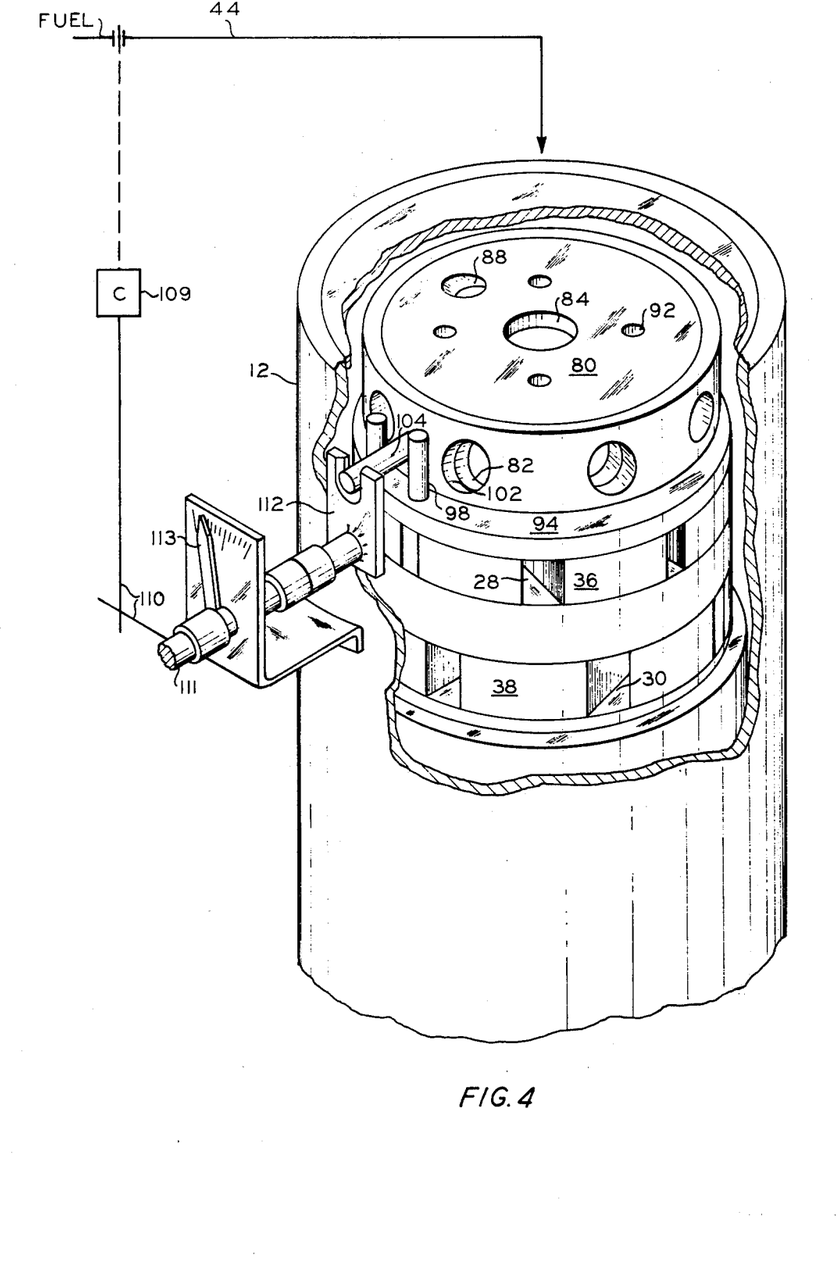
FIG. 4 is a diagrammatic perspective view, partially cut away, of the upstream end of the combustor of FIG. 1 showing the flame tube and the variable dome valve, and further illustrating certain operational features thereof.

Further, it has been found that when combustors are provided with variable dome valves, such as dome valve 18 in FIGS. 1 and 4, it is desirable to control the effective open area of the air inlet openings in said dome valve in accordance with fuel flow to the combustor. Any suitable control means can be provided for this purpose and, referring now to FIG. 4, the specific means there illustrated forms no part, per se, of the present invention and can be modified or substituted for by any means known in the art. As shown diagrammatically in FIG. 4, controller 109, responsive to the flow of fuel through the orifice in fuel conduit 44, actuates linkage 110, which is operatively connected to the outboard end portion of control rod 111, and programs rotation of said control rod in one direction or the other. Yoke member 112 is fixed to the inboard end of rod 111 inside of housing 12. The U-shaped recess in one end of yoke member 112 coacts with actuator pin 104 to cause rotation of throttle ring 100 within the limits of the space between stop pins 98 and thus adjust the effective size of the opening provided by openings 82 and 102. As here shown, said openings 82 and 102 are in direct register with each other to provide the maximum opening into dome valve 18. Indicator pin 113 is provided to indicate the degree of rotation of throttle ring 100. A knob (not shown) can be provided on the outboard end of control rod 111 for manual operation, if desired.

Figure 5A:
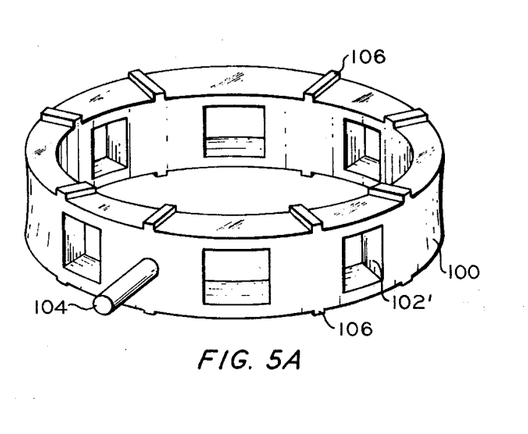
FIG. 5A is a perspective view illustrating a modification of the element illustrated in FIG. 5.
Figure 6:
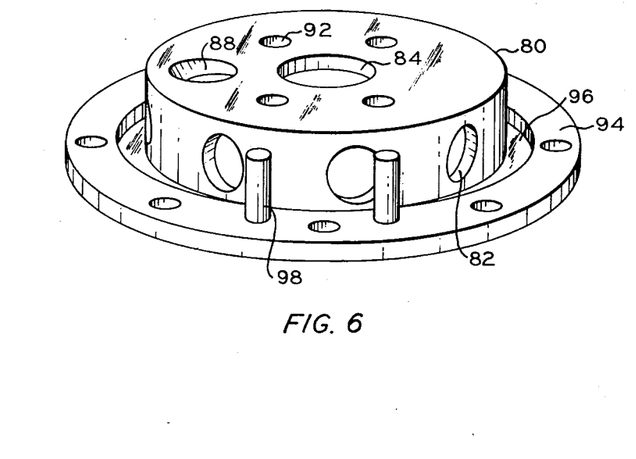
FIG. 6 is a perspective view further illustrating another element of the dome valve of the combustor of FIG. 1.
Figure 6A:
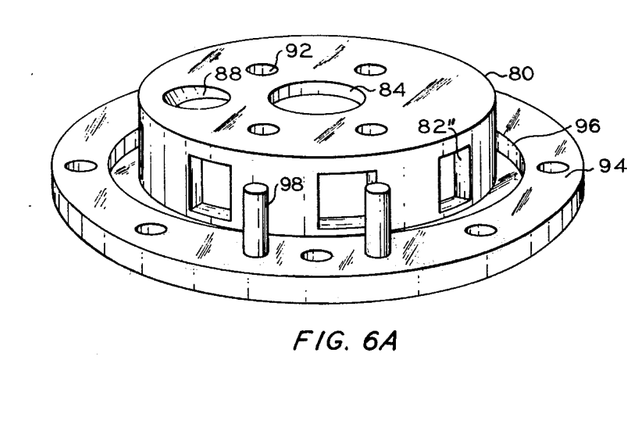
FIG. 6A is a perspective view illustrating a modification of the element illustrated in FIG. 6.

The openings provided in said cylindrical inner member 80 and said throttle ring 100 have been illustrated as circular in shape. However, it is within the scope of the invention for said openings to the rectangular in shape, e.g., square shown by opening 102' in FIG. 5A and opening 82" in FIG. 6A. An advantage of square openings is that the amount of air admitted through the openings is directly proportional to the rotation of the throttle ring in varying the size of said openings. With circular openings the amount of air admitted through said openings is not proportional to said rotation. A further advantage is the increase in area of a square opening, e.g., about 28 percent for a 0.75 inch square opening over a 0.75 inch diameter circular opening.

Said inner member 80 is illustrated as being cylindrical, and said throttle ring 100 has been illustrated as circular. This is preferred. However, it is within the scope of the invention for the interior of said inner member to be tubular, but not necessarily cylindrical.

In one method of operating the combustor of FIG. 1, a first stream of air is introduced through dome valve 18 at a controlled rate into first combustion region 27 of the combustor. In the combustor of FIG. 1 said first stream of air is introduced generally radially with respect to said first combustion region. A stream of fuel is introduced, preferably axially, into said first combustion region 27. In one embodiment, said fuel is sprayed into said first combustion region as a hollow cone and said first stream of air is introduced around the stream of fuel and intercepts said cone. The rate of introduction of said first stream of air is controlled in accordance with the rate of introduction of said stream of fuel, as described elsewhere herein.

A second stream of air is tangentially introduced into said first combustion region 27 via tangential slots 28 in a direction tangential the wall of said first combustion region. Said slots 28 thus impart a swirl to said second stream of air. The direction of said swirl can be either clockwise or counter-clockwise. When employing the slots illustrated in FIG. 2 the direction of swirl will be clockwise, locking downstream in the flame tube. Said first and second streams of air form a combustible mixture with said fuel, and at least partial combustion of said mixture is caused in said first combustion region. Hot combustion products and any remaining said mixture are passed from said first combustion region 27, through orifice 29, and into second combustion region 31.

A third stream of air is tangentially introduced into said second combustion region via tangential slots 30 in a direction tangential the wall of said second combustion region. Said slots 30 thus impart a swirl to said third stream of air. The direction of swirl imparted to said third stream of air can be either clockwise or counter-clockwise, but is preferably opposite the direction of swirl imparted to said second stream of air by said slots 28. When employing the slots illustrated in FIG. 3 the direction of swirl of the third stream of air will be counter-clockwise, looking downstream of the flame tube. Said third stream of air surrounds said hot combustion products and any remaining mixture entering from the first combustion region, and mixes therewith. Combustion is essentially completed in said second combustion region.

Preferably, a fourth stream of air is introduced via openings 34 and mixes with combustion products leaving said second combustion region. Said fourth stream of air comprises quench or dilution air. The hot combustion gases then exit the combustor to a turbine or other utilization.

A number of advantages are realized in the practice of the invention. The combustors described herein are low emission combustors. Said combustors are small compact combustors which are particularly well suited to be employed in locations where space is important, e.g., under the hood of an automobile. Yet, the principles involved and the advances provided by the invention are applicable to combustors employed in larger power plants, e.g., large stationary gas turbine engines, boilers, etc. The variable dome valves employed in combination with the flame tubes in the combustors described herein contribute to the overall efficiency of the combustors. Said variable dome valve is located in a relatively cool low stress region of the combustor, i.e., at the upstream end of the flame tube. Said variable dome valve is a small component comprising only one movable element which operates with only a small movement from a closed position to an open position. Thus, rapid response to changing operating conditions is provided. This combination of a variable dome valve with relatively small flame tubes renders the combustors particularly well suited for mobile installations. In contrast, the "variable hardware" of the prior art combustors usually provides the adjustments at a plurality of locations in the combustors, including adjustments to the hot flame tube itself. The result is usually a large, bulky, unit which in practical operation functions poorly, if at all.

EXAMPLE

Test runs carried out in combustors having configurations essentially like that of the combustor illustrated in FIG. 1, and calculations based on the data obtained in said test runs, have demonstrated the advantages of employing the valve of the invention on the flame tube of combustors. Said test runs and data including operation of the combustors under comparable conditions wherein: (a) the effective size of the openings in dome valve 18 were varied in accordance with fuel flow to the combustor; and (b) the effective size of the openings in dome valve 18 was maintained fixed at about 9.9 percent of the total flame the openings (dome valve openings plus other flame tube openings). Said test runs were carried out over a simulated driving cycle consisting of deceleration, idling (from 0 to less than about 20 miles per hour), low road load (from about 20 to about 40 miles per hour), high road load (greater than about 40 miles per hour), and acceleration. The results showed there was a decrease in the production of $NO_x$ emissions in the order of 80 to 85 percent when varying the effective size of the dome valve openings in accordance with fuel flow, as compared to operating with the dome valve openings fixed at said 9.9 percent open. Said decrease in $NO_x$ production was accomplished with complete control of CO emissions production at a level less than present EPA standards.

By way of further illustration, but not by way of limitation, the above-described inner member 80 of dome valve 18 in FIG. 1 had an inside diameter of 3.500 inches and an outside diameter of 4.000 inches. Said flange 94 had an outside diameter of 5.5 inches. Said throttle ring 100 had an inside diameter of 4.008 inches and an outside diameter of 4.5 inches. The openings in said inner member 80 and said throttle ring 100 were 0.750 inches in diameter.

Figure 7A:
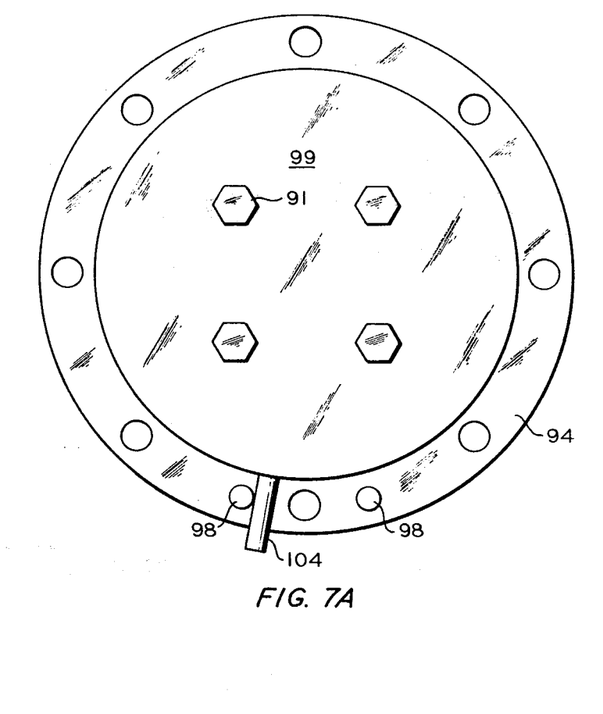
FIG. 7A is a top plan view illustrating a modification of the valve of the invention.

As mentioned above, while the valve of the invention has been described with particular reference to being employed as a dome valve on the dome or upstream end of the flame tube in a combustor, the valve can be employed in other locations. In general, said valve can be employed on the end of other conduits for controlling flow of a fluid through said conduits. In such instances the valve would preferably be provided with a cover plate 99 secured to the closed end of inner member 80 by means of suitable mounting bolts 91 extending into openings 92 in said closed end as shown in FIG. 7A. Said cover plate would preferably extend to the other edge of throttle ring 100 in such instances.

The term "air" is employed generically herein and in the claims to include air and other combustion supporting gases.

Thus, while certain embodiments of the invention have been illustrated and described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A variable dome valve, adapted to be mounted on the upstream dome end of a flame tube in a combustor for controlling flow of a stream of combustion air into said flame tube, said valve comprising:

a fixed generally cylindrical inner member, closed at one end to the flow of said combustion air and open to the flow of said combustion air at the other end;

a plurality of openings provided at spaced apart locations around and extending through the cylindrical wall of said inner member adjacent said closed end thereof;

a mounting flange secured to and around said inner member adjacent said open end thereof for mounting said valve on a said flame tube;

an adjustable throttle ring rotatably mounted on and around said cylindrical inner member;

a plurality of openings provided around and extending through said throttle ring, said openings being of a size, a shape, a number, and located at spaced apart locations, corresponding to said openings in said inner member, and means for rotating said throttle ring around said inner cylindrical member so as to bring said openings in said throttle ring into and out of register with said openings in said inner member and vary the effective combined open area of said openings and thereby control the flow of said stream of combustion air into said flame tube, wherein:

a groove is provided in said mounting flange adjacent and around the base of said cylindrical inner member;

said throttle ring seats in and rotates in said groove;

a pair of spaced apart stop pins extend perpendicularly from said flange and adjacent the outer wall surface of said cylindrical inner member; and said means for rotating said throttle ring comprises an actuator pin extending radially from the outer wall surface thereof at a location between said stop pins.

2. A valve, adapted to be mounted on the end of a tubular conduit for controlling flow of a stream of fluid into said conduit, said valve comprising:

a fixed tubular inner member, closed at one end to the flow of said stream of fluid, and open to the flow of said fluid at its other end;

a plurality of openings provided at spaced apart locations around and extending through the tubular wall of said inner member adjacent said closed end thereof;

a mounting flange connected to and provided around the base of said tubular inner member adjacent said open end thereof, for mounting said valve on the end of said conduit;

a groove provided in said flange adjacent and around the base of said tubular inner member;

an adjustable annular throttle member rotatably mounted on and around said tubular inner member, and rotatably seated in said groove in said flange;

a plurality of openings provided around and extending through said throttle member, said openings being of a size, a shape, a number, and located at spaced apart locations, corresponding to said openings in said tubular inner member;

a pair of spaced apart stop pins extending perpendicular from said flange and adjacent said tubular inner member; and an actuator pin extending radially from the outer wall surface of said throttle member, at a location between said stop pins, for rotating said throttle member around said tubular inner member, within the limits of said stop pins, so as to bring said openings in said throttle member into and out of register with said openings in said tubular inner member and thereby vary the effective size of said openings and control the flow of said stream of said fluid into said conduit.

3. A valve according to claim 2 wherein:
said tubular inner member is generally cylindrical in shape; and
said throttle member is circular in shape.

4. A valve according to claim 3 wherein:
said openings in said cylindrical inner member are circular in shape and extend radially therethrough, and
said openings in said circular throttle member are circular in shape and extend radially therethrough.

5. A valve according to claim 3, wherein:
said openings in said cylindrical inner member are circular in shape and extend tangentially therethrough; and
said openings in said circular throttle member are circular in shape and extend tangentially therethrough.

6. A valve according to claim 3, wherein:
said openings in said cylindrical inner member are rectangular in shape and extend radially therethrough; and
said openings in said circular throttle member are rectangular in shape and extend radially therethrough.

7. A valve according to claim 3 wherein:
a plurality of friction reducing lugs extend from the bottom surface of said circular throttle member at spaced apart locations; and
in operation, said lugs movably bear against the bottom of said groove in said flange.

8. A valve, adapted to be mounted on the end of a tubular conduit for controlling flow of a stream of fluid into said conduit, said valve comprising:

a fixed tubular inner member, open at its downstream end to the flow of said fluid;

closure means closing the upstream end of said tubular inner member to the flow of said fluid;

a plurality of openings provided at spaced apart locations around and extending through the tubular wall of said inner member adjacent said closed end thereof;

a mounting flange connected to and provided around the base of said tubular inner member adjacent said open end thereof, for mounting said valve on the end of said conduit;

a groove provided in said flange adjacent and around the base of said tubular inner member;

an adjustable annular throttle member rotatably mounted on and around said tubular inner member, and rotatably seated in said groove in said flange;

a plurality of openings provided around and extending through said throttle member, said openings being of a size, a shape, a member, and located at spaced apart locations, corresponding to said openings in said tubular inner member;

a pair of spaced apart stop pins extending perpendicular from said flange and adjacent said tubular inner member; and an actuator pin extending radially from the outer wall surface of said throttle member, at a location between said stop pins, for rotating said throttle member around said tubular inner member, within the limits of said stop pins, so as to bring said openings in said throttle member into and out of register with said openings in said tubular inner member and thereby vary the effective size of said openings and control the flow of said stream of said fluid into said conduit.

9. A valve according to claim 8 wherein said closure means comprises a cover plate secured to the upstream end of said tubular inner member and extending to the outer edge of said throttle ring.

10. A valve according to claim 9 wherein:
said tubular inner member is generally cylindrical in shape; and
said throttle member is circular in shape.

* * * * *

UNITED STATES PATENT OFFICE
CERTIFICATE OF CORRECTION

PATENT NO. : 4,049,021

DATED : September 20, 1977

INVENTOR(S) : Ellsworth H. Fromm and Norman R. Murray

It is certified that error appears in the above-identified patent and that said Letters Patent are hereby corrected as shown below:

Column 10, line 53, delete "member" and insert --- number ---.

Signed and Sealed this

Eleventh Day of April 1978

[SEAL]

Attest:

RUTH C. MASON
Attesting Officer

LUTRELLE F. PARKER
Acting Commissioner of Patents and Trademarks